United States Patent [19]

Guerrieri

[11] 4,275,022
[45] Jun. 23, 1981

[54] BUBBLE CAP TRAY

[76] Inventor: Salvatore A. Guerrieri, 503 Beverly Rd., Newark, Del. 19711

[21] Appl. No.: 136,103

[22] Filed: Mar. 31, 1980

[51] Int. Cl.³ .................................................. B01F 3/04
[52] U.S. Cl. .............................. 261/114 TC; 202/158; 261/114 A
[58] Field of Search ........ 261/114 R, 114 A, 114 TC, 261/DIG. 44; 52/246; 202/158, 270

[56] References Cited

U.S. PATENT DOCUMENTS

| | | | |
|---|---|---|---|
| 1,686,542 | 10/1928 | Winkler et al. | 261/114 A |
| 1,808,276 | 6/1931 | Widdell | 261/114 A |
| 1,935,709 | 11/1933 | Hall | 261/114 A |
| 2,510,586 | 6/1950 | Kelley | 261/114 A |
| 2,510,589 | 6/1950 | Kraft | 261/114 A |
| 2,525,218 | 10/1950 | Glitsch | 261/114 A |
| 2,690,332 | 9/1954 | Jorgensen | 261/114 TC |
| 3,693,948 | 9/1972 | Kloss | 261/114 A |
| 3,914,352 | 10/1975 | Guerrieri | 261/114 TC |
| 4,104,338 | 8/1978 | Guerrieri | 261/114 TC |

*Primary Examiner*—Richard L. Chiesa

[57] ABSTRACT

This invention presents an improved and less costly method for closing the ends of the tray and cap channels which make up trays such as specified in the reference patents. Construction of the bubble cap trays in accordance with this invention reduces to a minimum the number of parts needed to complete the assembly of the bubble cap tray and its installation in a tower.

9 Claims, 4 Drawing Figures

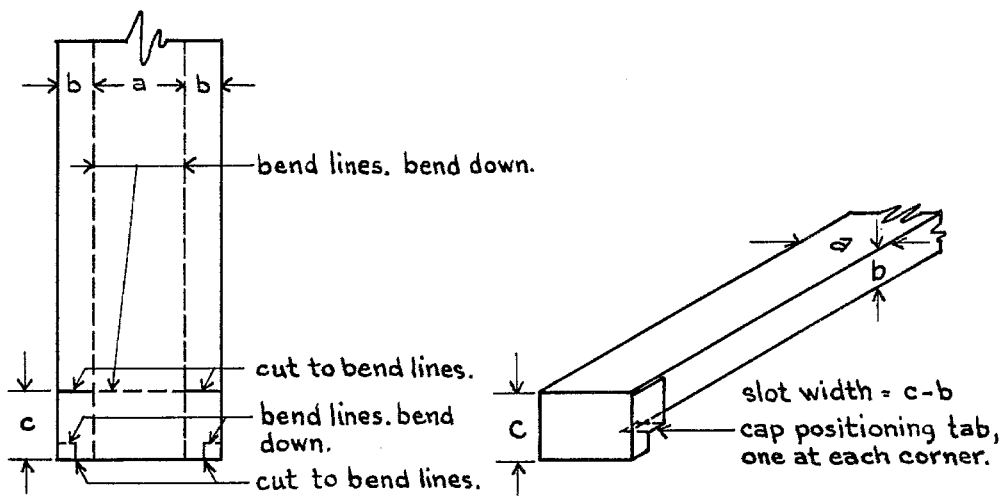
FIGURE 1
Layout of cap sheet.
FIGURE 1A
Isometric view of one end of cap.
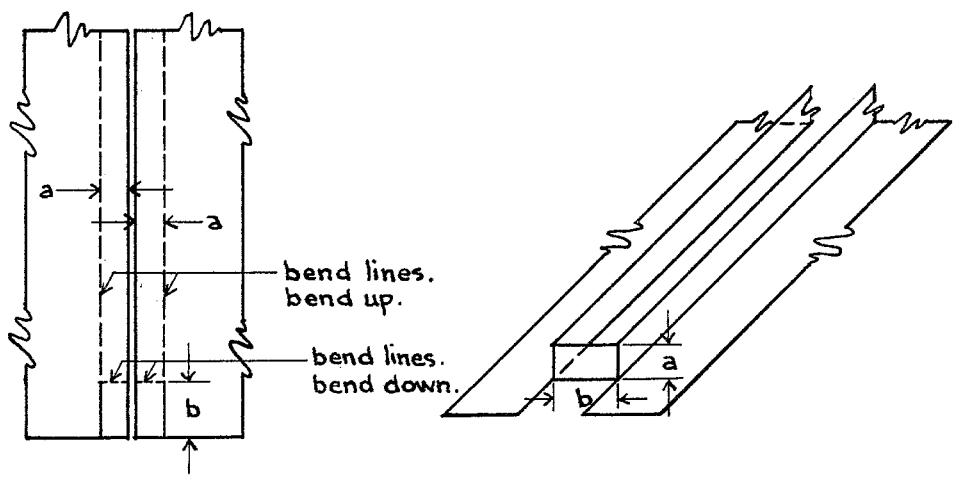
FIGURE 2
Layout of chimney and tray sheet.
FIGURE 2A
Isometric view of one end of chimney.
Figures show only one end of cap and chimney components.

BUBBLE CAP TRAY

FIELD OF THE INVENTION

The present invention is directed to an improvement in the construction of bubble cap trays used in towers in distillation service or in other applications which require intimate vapor-liquid contact.

This invention application provides an improvement over the inventions of my U.S. Pat. Nos. 3,914,352 and 4,104,338, which disclosed improvements over prior art in bubble cap tray constructions leading to better performance and lower cost.

DESCRIPTION OF THE PRIOR ART

A vapor-liquid contactor, such as distillation tower, has a plurality of trays spaced one above the other within an enclosure formed by the wall of a vertical shell, closed at top and bottom, having inlet and outlet connections, etc., attached at locations according to the needs of the process conducted therein as is well known by those who are familiar with the art. Gases and vapors flow upward through a tray while a liquid flows across the tray from the outlet of the downcomer from the tray above to the inlet of the downcomer leading to the tray below. The gas or vapor entering a tray, rises through the liquid passing over the tray and generates a turbulent vapor-liquid interface across which mass and heat transfer can take place.

The most widely used vapor-liquid contacting device has been the bubble cap tray. Such trays are usually constructed of metal plates which are fastened to suitable vertically spaced supports firmly attached to the tower. The plates are pierced with holes, and short tubes are fitted into these holes to serve as chimneys for conveying the gases and vapors through the trays. Caps, which are provided with slots uniformly spaced along the periphery, are placed over the chimneys to divert the vapor stream downward and into the liquid flowing across the trays. Thus vapor from a tray passes upwardly through the chimneys of the tray above it, then reverses its direction and flows down through the annular space between the cap and chimney, then through the slots along the cap's periphery into the liquid. As just described both the chimneys and caps are round, but to improve performance, almost every other conceivable cap shape has been advocated or tried. These shapes include hexagonal caps and relatively long narrow caps, generally rectangular in shape. It is general practice to provide slots as described above for all caps whatever their shape. The most popular round caps range between four and eight inches in diameter, although both larger and smaller caps have been used. These are usually, but not always, arranged on the trays in an equilateral triangular pattern and the clearance between caps is usually, but not always, about one quarter of the cap diameter. Caps are usually installed with the bottom edge between ½ and 2 inches above the tray floor.

The long rectangular caps did not gain the popularity of the round caps, but their performance was better. The improvement was at least partly due to the more uniform distribution of vapor over the whole tray because of the lower liquid gradient across the tray. The improved vapor-liquid contact thus obtained resulted in higher tray efficiencies.

Following World War II, the principal development effort has been on the sieve tray and its variations, even though sieve trays are handicapped because of poor performance at operating rates moderately lower than design. Valve trays overcome this difficulty to some extent but are more complicated and more costly than sieve trays. The customary round bubble cap tray, unlike sieve trays, can retain good performance to lower than design rates, but cannot compete with sieve trays because of higher cost and poorer performance at design rates. The bubble cap tray of my cited inventions is a significant improvement over former bubble cap trays and is the equal of or better than sieve trays in many respects.

OBJECTIVE OF THIS INVENTION

An objective of this invention is to improve further the construction of bubble cap trays, thus to realize a further reduction in the cost of construction without sacrificing performance.

These objectives and others will become apparent from the following disclosure with reference to the accompanying drawing.

SUMMARY OF THE INVENTION

The complete tray, according to this invention includes an assembly of U-shaped flat bottomed channels of two different widths and thicknesses. In the construction of this invention, the narrower channels, which are used to form the caps, are the thicker ones, whereas the wider channels which are used to form the tray floors and chimneys are the thinner ones.

The wide channels are spaced parallel to each other a small distance apart with the sides of the channel pointing upward and with the ends of the spaces between the channels closed by end closures formed by bending outward a short piece at the end of the vertical sides, whereby the combination of two adjacent sides and the outwardly bent ends of the sides form a long, narrow chimney. The bottoms of said end closures are in the plane of the bottom faces of the channels. The distance between adjacent channels, depending upon the design operating conditions within the tower, ranges between fourth of an inch and 1½ inches. The widths of the channels may vary proportionately between 2 and 6 inches, and the height of the sides of the channels likewise may vary between three-fourths of an inch and 2 inches.

The narrow channels, from which the caps are formed, are placed over the chimneys with the sides of the channels pointing down and with their ends closed by bending downward a short length of the ends of the cap channels. The height of the downwardly bent ends determines the height of the cap above the tray. The outward portions of these bent ends extending beyond the width of the cap are bent inward 90° and brought into contact with the outside faces of the cap sides and firmly attached to the sides, whereby the combination of cap sides and bent ends provide a strong support for the caps. The lower corners of the bent ends are bent inward to form tabs which center the caps on the chimneys. The bottom edge of the cap is located only high enough above the floor of the tray to make a long, narrow opening or slot between the tray floor and the edge of the cap. The height of the slot, and hence the area of the opening is determined for each case by the vapor and liquid flow rates and other process conditions. In all cases, however, the bottom edge of the cap is lower than the top edge of the chimney in order to provide a liquid seal to prevent the passage of liquid through said tray to the tray below.

In order to promote bubbling as near as possible to the liquid inlet end of the tray in cases when the ratio of liquid to vapor is high, a plurality of holes may be provided along the sides of the cap on a line intermediate between the top and the bottom edge of the cap sides. These holes may be spaced for a distance of up to 12 inches from a point about one inch from the end of the cap.

DESCRIPTION OF THE DRAWING

Reference is made to the drawing wherein the elements of the invention are presented in four figures and like reference numerals denote like parts.

FIG. 1 is a sectional plan view of one end of a sheet of material from which a cap will be constructed. It has already been cut to the required length and width for the finished cap. Broken lines represent bend lines, whereas solid lines represent cut lines. The width of the formed cap is 'a', the width of the long sides of the cap is 'b', and the height of the top of the cap above the tray floor is 'c'. When installed, the cap is supported by the end closures which rest upon extensions of the tray base. Obviously, the width of the slot (the open area between the bottom edge of the cap and the top face of the tray) is equal to c-b.

FIG. 1A is an isometric view of the same end of the cap after having been cut and bent as just described. The vertical ends of the cap end closure which have been bent inward and are in contact with the sides of the cap are firmly fastened to the sides of the cap, thereby providing a strong support for the cap as well as stiffening the sides of the cap and providing a substantially leak-free closure for the end of the cap.

FIG. 2 is a partial plan view of one end of two adjacent tray sheets which have been cut to the required length and width. Again, broken lines represent bend lines, whereas solid lines represent cut lines. When cut and formed as indicated, the height of the chimney is 'a' and the width of the chimney is 'b'. Thus, the bottom of the tray extends a distance 'b' beyond the end of the chimney, and can serve as a base for the cap supports. The other long edge of each sheet is cut and bent in the same manner. To complete the construction, after making the indicated cuts near the ends of the sheets, the two narrow sections are bent upward and the ends are turned outward 90 degrees. These ends are then firmly fastened together, thereby making a leak-free closure for the ends of the chimneys.

FIG. 2A is an isometric view of the same end of two adjacent tray sheets after having been cut and bent as specified in FIG. 2. The construction is completed by fastening these two bent ends by spot welding or other means.

PREFERRED EMBODIMENT

The tray assembly requires no unusual or novel means of support or attachment to the tower shell. Standard practice, only modified to satisfy the needs of this invention, is followed, and therefore these parts need not be elaborated here.

Alternative, obvious methods of construction are considered to be within the scope of this invention. An example of such alternatives is the construction of the module shown in U.S. Pat. No. 4,104,338 which is seen to be a fully assembled tray and cap module. Instead, under certain circumstances, it may be preferable to assemble the tray module only and install the caps after the tray has been set on its supports in the tower. In this case, a single bolt at each end could serve to hold both the cap on the tray and the tray on its support. Another example refers to the tab on the cap end closure, which as described herein, is in a horizontal position when the cap is installed. Sometimes it might be preferable to switch the cut and bend lines shown in FIG. 1A, in which case the finished tab would be in a vertical position. Other forms are possible for these tabs.

Examples could be given of different methods for forming and assembling the caps and chimneys and for forming and joining adjacent modules, but such variations are considered to be within the scope of the invention.

I claim:

1. An improved bubble cap tray for use in vapor-liquid contacting system constructed of channels of two different widths and thicknesses, each channel having a cross section shaped approximately like a block U, the wider channels forming the tray floor and chimneys, being spaced from each other with the sides of channels pointing upward and the space between two adjacent troughs being closed at each end by an end closure whereby the combination of the sides of two adjacent channels and the two end closures form a long, low, narrow chimney; the narrower channels, with sides pointing downward, and with each end closed by end closures, to form caps which are positioned over the chimneys, thereby providing a continuous vapor passage connecting the space below said channels with the space above them, said vapor passages being uniformly spaced across the diameter of the tower, with their long axes parallel to each other, and to the liquid stream as it flows from the inlet side of the tray to the outlet side, the improvement wherein the cap end closures, including centering tabs, are formed integrally with the sides and top of the cap from a single sheet of material, the tabs which center the caps on the chimneys being formed integrally with the cap end closures by bending inwardly the lower corners of the cap end closures for a distance approximately equal to the space between the inside face of the cap and the outside face of the chimney, and the chimney end closures of the tray channels being formed integrally with the tray channels.

2. The cap of claim 1, wherein a sheet of the cap material, previously cut to the length and width required for forming a cap, is cut along a line normal to the long axis of the sheet, for a distance equal to the width of a side of the cap, said cuts extending from each long edge of the sheet at a distance from the end equal to the height of the top of the cap above the tray.

3. The cap of claim 2, wherein the ends and sides of said sheet are bent downwardly to an angle of 90° relative to the plane of the original sheet, the bend lines for the side members being parallel to the long axis of the sheet and at a distance equal to one half of the cap width, thereby forming downwardly oriented cap sides of the required width, the bend lines for the end closure being the line of the cuts specified in claim 2, thereby forming downwardly oriented cap end closures and supports for the cap.

4. The cap end closure of claim 3, wherein at each lower corner a vertical cut is made at a distance between one eighth inch and one inch from each vertical edge extending upward for a distance equal to the space between cap side and chimney side, and the free end of the cut is bent inward toward the chimney side to a horizontal position, thereby developing a horizontally oriented cap centering tab, or wherein said cut and bend lines are reversed to form a similar but vertically oriented centering tab.

5. The cap of claim 1, wherein said end closures are securely fastened to the cap sides.

6. The tray channels of claim 1, wherein a sheet of material previously cut to the length and width required for forming a tray channel is bent on lines parallel to the long axis of the sheet at a distance from the long edge equal to the height of the long sides of the chimney, which is formed by two such channels spaced near each other at a distance equal to the desired width of the chimney.

7. The channel of claim 6, wherein a cut is made along said bend line for a distance equal to the width of the chimney and the resulting free end is bent outward 90°.

8. The channel of claim 7, wherein a plurality of said channels are spaced parallel to each other, and the outwardly bent ends of each channel are in contact with similar bent ends of the adjacent channel, and the two bent ends are securely fastened to each other.

9. The cap of claim 1 which includes a plurality of holes along a line intermediate between the bottom edge of the cap and its top, said holes being located near the tray's liquid inlet end and extending for a distance of up to about 12 inches from a point about one inch from the end of the cap.

* * * * *